(12) United States Patent
Goddard et al.

(10) Patent No.: US 10,642,948 B2
(45) Date of Patent: May 5, 2020

(54) SYSTEM FOR INTRODUCING PULSATION INTO A FLUID OUTPUT FOR AN ORAL CARE APPLIANCE

(71) Applicant: KONINKLIJKE PHILIPS N.V., Eindhoven (NL)

(72) Inventors: Gregory Russ Goddard, Kenmore, WA (US); Anandh Balakrishnan, Gold Bar, WA (US); Yu-Wen Chang, Mercer Island, WA (US); John Theodore Ferrier, Enumclaw, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 853 days.

(21) Appl. No.: 15/117,845

(22) PCT Filed: Feb. 9, 2015

(86) PCT No.: PCT/IB2015/050947
§ 371 (c)(1),
(2) Date: Aug. 10, 2016

(87) PCT Pub. No.: WO2015/132684
PCT Pub. Date: Sep. 11, 2015

(65) Prior Publication Data
US 2017/0007382 A1 Jan. 12, 2017

Related U.S. Application Data

(60) Provisional application No. 61/948,244, filed on Mar. 5, 2014.

(51) Int. Cl.
A61C 17/028 (2006.01)
A61C 1/00 (2006.01)
(Continued)

(52) U.S. Cl.
CPC ........ *G06F 17/5072* (2013.01); *A61C 1/0061* (2013.01); *A61C 17/028* (2013.01); *B05B 1/086* (2013.01); *G06F 17/505* (2013.01)

(58) Field of Classification Search
CPC ..... A61C 17/028; A61C 1/0061; B05B 1/086; A61H 9/00; A61H 9/007; A61H 9/028;
(Continued)

(56) References Cited

U.S. PATENT DOCUMENTS 3,509,874 A * 5/1970 Stillman ............... A46B 11/063
601/163
3,840,033 A 10/1974 Warsinger
(Continued)

FOREIGN PATENT DOCUMENTS

CN 201505189 U 6/2010
CN 102724929 A 10/2012
(Continued)

*Primary Examiner* — Quang D Thanh

(57) ABSTRACT

The appliance includes a jet source of fluid, and a nozzle assembly through which the fluid is directed and then out for application to the teeth. A flow interrupter assembly is mounted within the nozzle assembly, such that the interrupter assembly is responsive to the fluid flow to produce momentary successive interruptions of the fluid flow by the action of the interrupter assembly moving from an original position to a flow interrupting position and then returning to its original position as the flow decreases and then is interrupted, due to the fluid flow itself, resulting in a cyclical perturbation in the fluid flow from the nozzle, by flow action alone.

5 Claims, 4 Drawing Sheets

(51) Int. Cl.
*G06F 17/50* (2006.01)
*B05B 1/08* (2006.01)

(58) Field of Classification Search
CPC .. A61H 13/00; A61H 13/005; A61H 33/6021; A61H 33/6036; A61H 33/6052; A61H 33/6057
See application file for complete search history.

(56) References Cited

U.S. PATENT DOCUMENTS

| | | | |
|---|---|---|---|
| 4,141,352 A | 2/1979 | Ebner et al. | |
| 4,184,805 A | 1/1980 | Arnold | |
| 4,239,409 A * | 12/1980 | Osrow | A46B 13/06 401/281 |
| 4,365,752 A | 12/1982 | Waisbren et al. | |
| 4,532,530 A | 7/1985 | Hawkins | |
| 4,819,745 A | 4/1989 | Walter | |
| 5,095,893 A * | 3/1992 | Rawden, Jr. | A61C 17/032 601/165 |
| 6,081,945 A * | 7/2000 | Keene | A61H 33/6036 239/383 |
| 6,171,268 B1 * | 1/2001 | Zhadanov | A46B 13/06 601/112 |
| 6,279,670 B1 | 8/2001 | Eddison et al. | |
| 6,305,617 B1 | 10/2001 | Yu | |
| 7,362,000 B1 | 4/2008 | DeFrank | |
| 7,740,188 B2 | 6/2010 | Foldyna et al. | |
| 8,162,078 B2 | 4/2012 | Anderson | |
| 2006/0078844 A1 | 4/2006 | Goldman et al. | |
| 2009/0100620 A1 | 4/2009 | Gatzemeyer et al. | |
| 2010/0304327 A1 | 12/2010 | Grez et al. | |
| 2012/0183926 A1 | 7/2012 | Shalev | |

FOREIGN PATENT DOCUMENTS

| | | |
|---|---|---|
| CN | 102846392 A1 | 1/2013 |
| JP | H0759800 A | 3/1995 |
| JP | 2006184926 A | 7/2006 |
| WO | 2011060327 A1 | 5/2011 |
| WO | 2013000208 A1 | 1/2013 |

* cited by examiner

SYSTEM FOR INTRODUCING PULSATION INTO A FLUID OUTPUT FOR AN ORAL CARE APPLIANCE

CROSS-REFERENCE TO PRIOR APPLICATIONS

This application is the U.S. National Phase application under 35 U.S.C. § 371 of International Application No. PCT/IB2015/050947, filed on Feb. 9, 2015, which claims the benefit of U.S. Provisional Patent Application No. 61/948,244, filed on Mar. 5, 2014. These applications are hereby incorporated by reference herein.

TECHNICAL FIELD

This invention relates generally to oral care appliances used for interproximal cleaning, and more particularly concerns producing fluid pulses by interrupting an output fluid jet from the appliance.

BACKGROUND OF THE INVENTION

The removal of interproximal plaque is important for the maintenance of gingival health, prevention of periodontal disease and the reduction of caries, although gingival (gum) health and prevention of periodontal disease are important independent of plaque removal from the interproximal areas.

Accordingly, various attempts have been made relative to making interproximal cleaning and gingival care more effective. Such attempts include fluid jet and fluid droplet appliances. Fluid jets have proven to be an effective technique, for depth penetration in the interproximal areas, plaque removal efficiency and treatment of the gum areas. Pulsation of a water jet to form a series of liquid pulses, sometimes known as slugs, has been shown to be effective, with larger and more localized impact stress, because of the hammering effect of successive pulses/slugs; larger velocity of the individual pulses/slugs across the surface being cleaned; an improved ratio of impacted area to volume of water; loading cycle, which enhances the process of debonding the biofilm from the substrate; and short duration loading, which tends to minimize the energy loss.

A variety of mechanical approaches have been used to effectively interrupt a water jet, to produce the liquid slugs. These include rotating discs containing slots, holes or sprockets, centrifugal flow rotors, piezoelectric actuation devices, rapid valve actuation and explosive boiling. Although each of these techniques do in fact produce a series of liquid pulses/slugs from a water jet, they have the disadvantages of complexity, expense and short lifetimes.

Hence, a system for producing liquid pulsation from a continuous jet is desirable which avoids the energy loss and short life times associated with the various known mechanical and similar actuation systems/methods.

SUMMARY OF THE INVENTION

Accordingly an oral care appliance for cleaning the interproximal areas of the teeth, comprises an appliance producing a fluid jet flow; a nozzle assembly for directing the fluid jet flow to an opening from the nozzle assembly; and a liquid flow interrupter assembly supported by a support member within the nozzle assembly, wherein the interrupter assembly is deflected from an original position by the fluid flow through the nozzle to interrupt the flow momentarily and then return to said original position as the flow decreases, introducing a cyclical perturbation in the fluid flow, producing a series of fluid pulses from the nozzle exit opening.

BEST MODE FOR CARRYING OUT THE INVENTION

The present invention is a system for interrupting a fluid jet flow, typically in the form of a fluid jet output, delivered from an appliance useful in interproximal teeth cleaning, in order to produce a pulsating output, referred to as liquid pulses, bursts or slugs, through the use of turbulent flow characteristics, as opposed to a mechanically/electrically driven pulsation device. While turbulent flow is typically avoided due to energy losses, by operating in the transitional range between turbulent and non-turbulent flow, transient vortex shedding occurs, interspersed with laminar flow. The higher vorticity results in the fluid pulses/slugs being stabilized as they exit the nozzle of the appliance.

The embodiments of the present invention include a deformable element which is in contact with the fluid as it moves through the nozzle assembly. In operation and function, as the element is deflected by the flow, its cross-section changes so as to perturb the flow, which results in a reduction of the deflection force. As the deflection force decreases, the element returns to its original position, resulting in cyclical pulsating liquid flow from the nozzle of the appliance.

Turbulent flow can be characterized by a dimensionless number, known as a Reynolds number, $Re=(\rho u^2)/(\mu u/L)$, where $\rho$=fluid density, u=average flow velocity, $\mu$=dynamic viscosity and L=characteristic length. Fluid flows at Reynolds numbers which are larger than 10,000 are typically turbulent, while low Reynolds number flows typically remain laminar. The present arrangement to produce liquid flow interruption relies upon the boundary layer changes between turbulent and laminar flow. Although laminar/turbulent flow transition is not identified by a Reynolds number, the transition does occur if the size of the object is gradually increased or the viscosity of the fluid is decreased, or if the density of the fluid is increased.

Various embodiments of liquid flow interrupter assemblies are shown and described below.

Figure 1A:
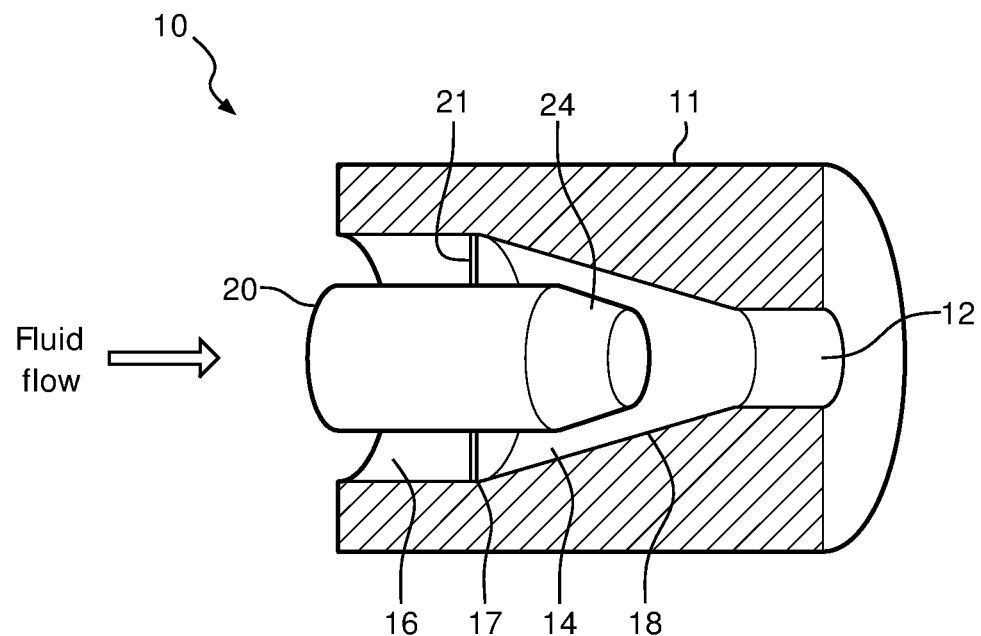
FIG. 1A is a cross-sectional view of one embodiment of the liquid jet pulsation assembly of the present invention for interproximal use.
Figure 1B:
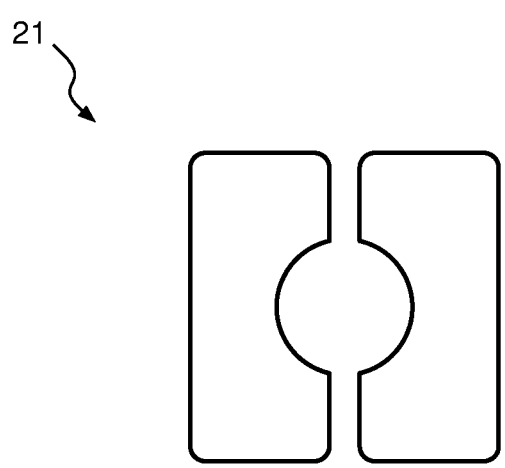
FIG. 1B is a top view showing one portion of the pulsation assembly of FIG. 1.

One embodiment of the present invention is shown in FIGS. 1A and 1B. FIG. 1A shows a nozzle assembly 10 of an interproximal teeth cleaning appliance using a fluid jet. An example of a fluid jet appliance is shown in U.S. Pat. No. 4,141,352. Other fluid jet appliances can be used. A stem portion of the nozzle assembly is shown at 11 and includes an exit opening 12. In the embodiment shown, the exit opening is approximately 1.2 mm in diameter. The nozzle assembly is made from a hard material such as plastic. Defined within the nozzle prior to the exit 12 is a chamber 14. Chamber 14 includes a rear portion 16, through which the flow of fluid from the appliance is directed. In the embodiment shown, the internal surface of the chamber angles inwardly at approximately 15° at a point 17, such that it gradually narrows toward the tip region. This angled portion is approximately 6 mm long, and is referred to at 18. A flow member 20 is supported within chamber 14.

In the embodiment shown, the support is a flexible member 21, shown in FIG. 1B. In the embodiment shown, it is 125 micrometers thick and extends between flow member 20 and the interior surface of the nozzle. Flexible member 21 acts like a cantilever in operation. In the embodiment shown, it is positioned at 17 where the interior surface begins to angle inwardly, although it could be positioned at other places. In the embodiment shown, the flow member is approximately 2 mm long and is generally cylindrical, with a tapered portion 24 at a front end thereof, the tapered portion having an angle substantially identical to the mating tapered portion 18 of the nozzle chamber. The fluid pressure is approximately 30 psi at the nozzle inlet.

In operation, as liquid from the appliance flows into the nozzle chamber around flow member 20, with the flow member in its original position, it pushes on the flexible support member 21, moving the flow member 20 toward the exit, until it causes the nozzle to close, interrupting the flow. As the flow through the nozzle is reduced and then shut off, the force on the flexible support member releases because of the configuration of the support member relative to the flow member, so that the flow member returns to its original position in the chamber, resulting in a renewed flow of fluid out the nozzle exit. This produces an interrupted pulsating flow, a pulsatile flow, out nozzle exit 12. The frequency and length of each pulse/slug is determined by the flow rate of the liquid, the ratio of the cross-sectional areas of the flow member, compared to the nozzle exit, as well as the spring constant of the support member and the mass of the flow member. The angle of the chamber affects the ramp up/down of the fluid velocity on either side of each pulse, producing the shape of the pulse.

FIGS. 2A-2D show another embodiment, with four variations, for producing a pulsating fluid flow. In each case, a vane (hydrofoil) is supported by springs within the nozzle chamber. In the embodiment shown, the flow member has two types of translational movement and two types of rotational movement, depending on the configuration of the vane and supporting spring configuration and arrangement.

Figure 2A:
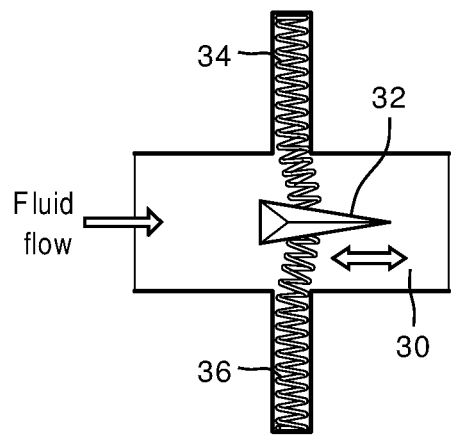
FIG. 2A is a cross-sectional view showing another embodiment of the pulsation assembly.
Figure 2B:
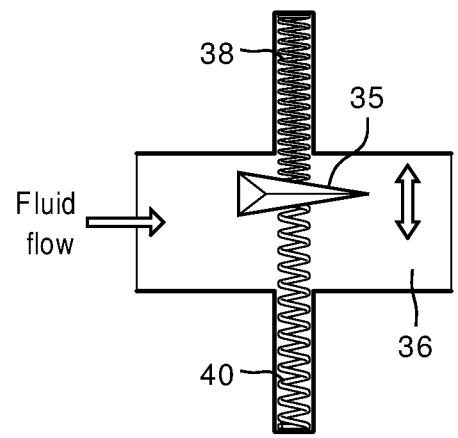
FIG. 2B is a cross-sectional view showing a variation of the assembly of FIG. 2A.
Figure 2C:
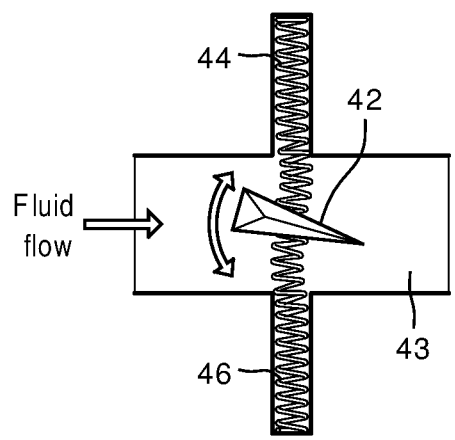
FIG. 2C is a cross-sectional view showing a variation of the embodiment of FIG. 2A.
Figure 2D:
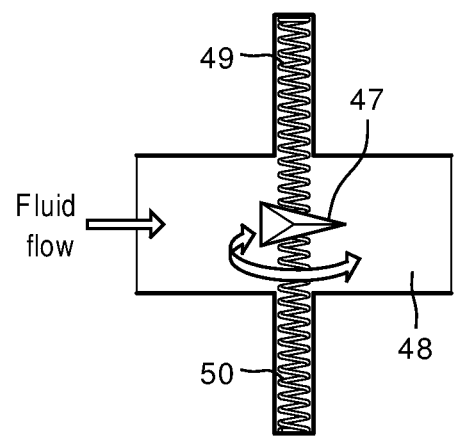
FIG. 2D is a cross-sectional view showing another variation of the embodiment of FIG. 2A.

FIG. 2A illustrates a nozzle chamber 30 and a hydrofoil vane 32 supported within the nozzle chamber by springs 34 and 36. FIG. 2A shows translational movement of the vane back and forth in the direction of the liquid flow through the chamber, due to the spring being substantially stiffer in one axis than the other. FIG. 2B shows movement of the vane 35 in chamber 36 along a path in the direction of the springs 38 and 40, 90° relative to the liquid flow through the nozzle chamber. The configuration of the vane is such as to produce a lift of the vane, and then a release as the flow first decreases and then is interrupted. FIG. 2C shows a rotation of a vane 42 in chamber 43, about an axis 90° to the direction of the springs 44 and 46, while FIG. 2D shows a rotation of vane 47 in chamber 48 about the axis of the springs 49 and 50. The rotation is produced by configuring the vane with asymmetrical surfaces in the plane of the page, rotating into and out of the page.

Figure 3A:
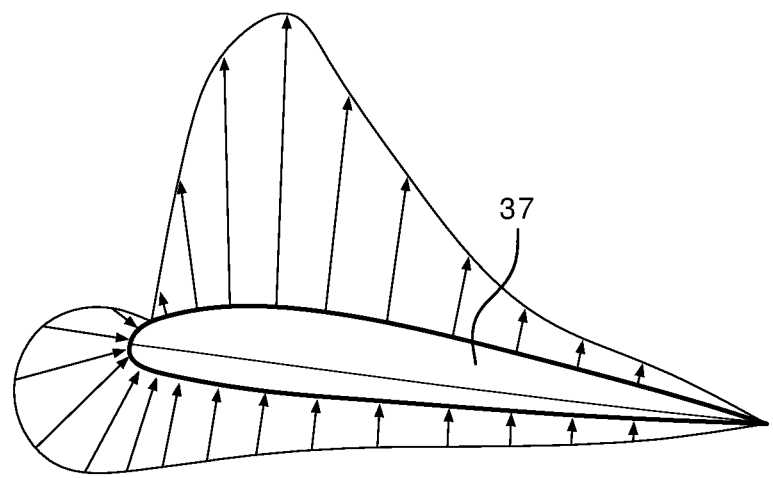
FIGS. 3A and 3B are elevational and perspective views of flow pressure profiles and vortices for a liquid flow over a vane.
Figure 3B:
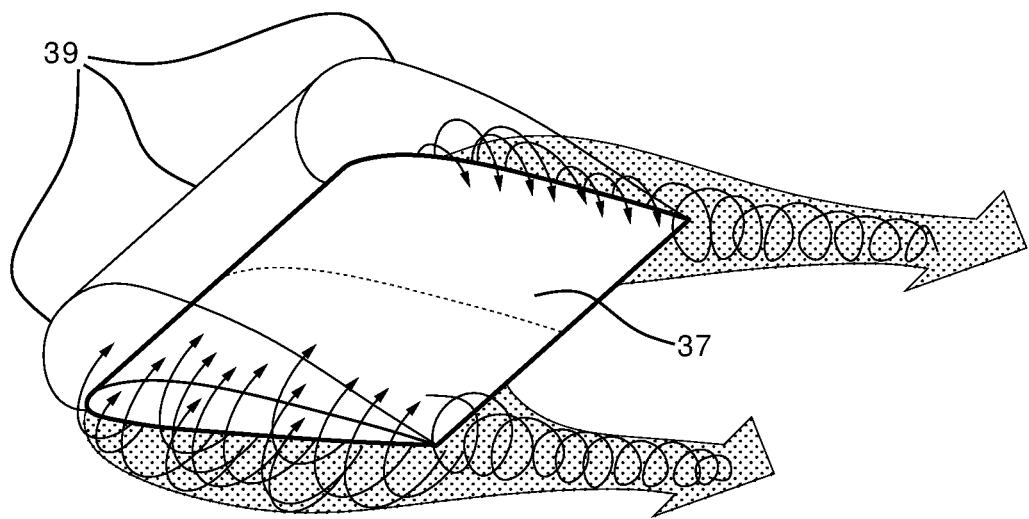

As the hydrofoil vane changes position, flutters of the vane "tail" produce pulsation and vortex shedding. This effect is shown in FIGS. 3A and 3B relative to a vane 37. The pressure profile is referred to at 39. As the tail whips, vortices are created which eventually break off. The drag change on the fluid during breakoff returns the vane to its equilibrium position, during establishment of a stable vortex behind the vane.

Relative to FIG. 2B, as liquid flows past the asymmetric vane, it produces a slight movement (lift) of the leading edge 37 thereof. As the leading edge changes position within the chamber, the flow is reduced through that area of the chamber, which reduces the lift force. The size of the hydrofoil vane must be sufficient to nearly, if not completely, obstruct the liquid flow as a result of its movement within the chamber, whether translational or rotational. In some cases, a near obstruction may be desirable, to prevent damage to the vane.

In each case, FIGS. 2A-2D, the springs tend to force the vane to return to its original position, so that the process can then cyclically repeat. The combination of vortex shedding and the oscillation of the vane causes pulsation of the fluid from the nozzle exit. The spring stiffness, the flow rate of the liquid, the mass of the vibrating hydrofoil vane, and the ratio of channel cross-sections to the division of the exit from the appliance affects the pulse frequency during actual flow.

Figure 4:
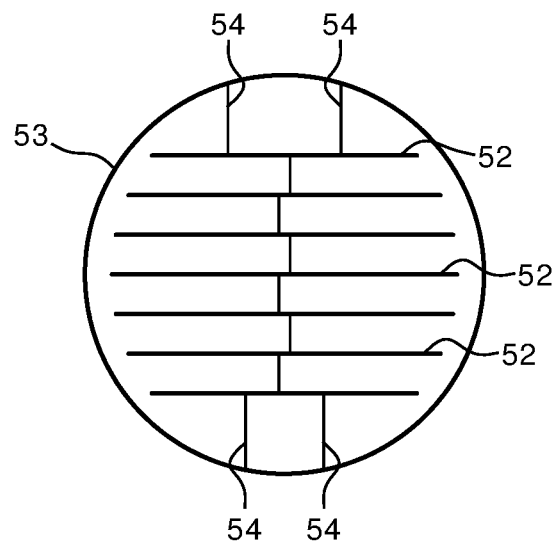
FIG. 4 is a simplified cross-sectional view showing another pulsation assembly.

FIG. 4 includes a plurality of flat flexible flaps or ribbons 52, which are suspended within chamber 53 at 90° to the flow, either horizontally (shown) or vertically by elements 54. FIG. 4 is a lateral cross-section of the nozzle chamber, so the fluid flow is into the page. The ribbons are flexibly connected together, with the upper and lower ones connected to the chamber walls by rubber or plastic card, similar to that of a conventional window blind. The ribbons are thus free to move. Liquid flow through the plurality of ribbons produces a waving motion of the individual elements/ribbons, as the elements move under the force of the fluid flow, resulting in pulsation of the flow from the nozzle.

Figure 5:
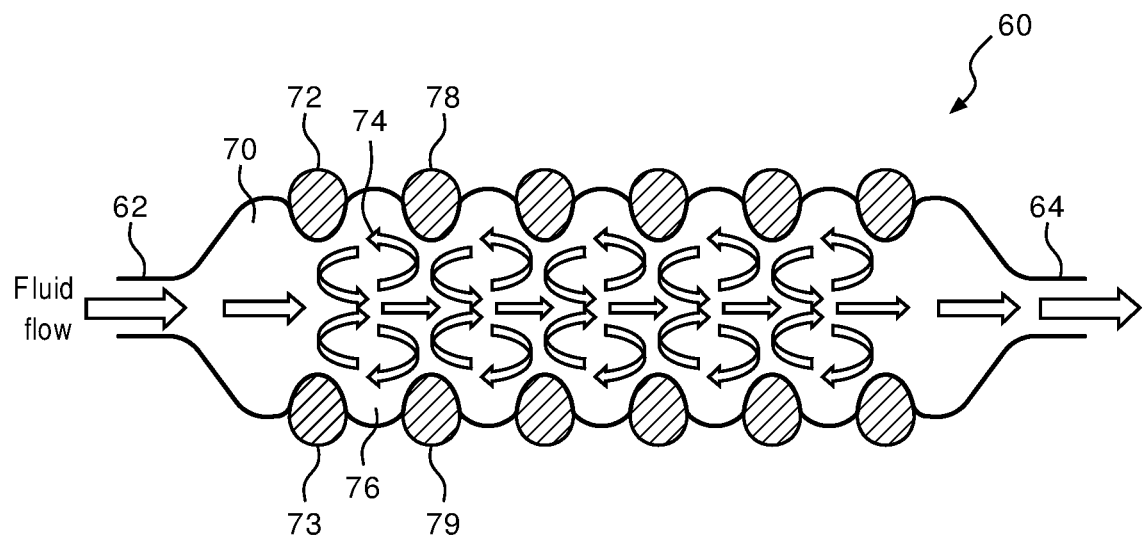
FIG. 5 is a cross-sectional view of another pulsation assembly embodiment.

Still another embodiment is shown in FIG. 5, which includes an expandable bladder 60. Bladder 60 is a flexible assembly which extends between a fluid inlet 62 from the appliance and fluid outlet 64 at the nozzle exit. Expandable bladder 60 consists of a plurality of stretchable portions, connected by stiff rings, typically made of hard plastic or metal. In the embodiment shown, the bladder arrangement has fixed rings spaced along the length of the bladder assembly.

The individual stretchable portions between adjacent rings are free to expand and contract as the liquid pressure through the bladder increases or decreases, with the rings limiting expansion of successive portions. Functionally, as the liquid flow enters the bladder at 62, the flow begins to expand the bladder outwardly, causing the first bladder portion 70 to expand outwardly to the first O-ring 72. This creates a circulation zone for the flow, as shown by the arrows 74. The flow continues to the next bladder portion 76, to ring 78. This results in a reduction in the pressure in the previous portion 70, resulting in a contraction of the bladder in that portion. This pattern is repeated in each subsequent portion, leading to successive semi-turbulent circulation within each portion, and hammering (pulsating) liquid at the outlet 64. The elasticity of the bladder portions, relative to the spaced stiff rings, as well as the dimensional ratio of the elastic and stiff (ring) portions, the flow rate of the fluid, the spacing of the rings, and the number of individual stretchable bladder portions, provide a capability of tuning the frequency and shape of the resulting liquid pulses from the outlet. The amplitude of the liquid pulses is largely controlled by the elasticity of the bladder portions. The results of the bladder embodiment of FIG. 5 are best achieved in non steady-state flow conditions.

The resulting turbulence within the bladder assembly must be sufficient to initiate vortices and shed those vortices, but not maintain a steady stream of them, since that would rob energy from the flow of liquid and reduce the amplitude of the resulting liquid pulses, as well as increase the noise of operation.

Accordingly, various structural arrangements have been disclosed which are positionable within a nozzle to produce an output pulsating stream of liquid for cleaning interproximal spaces. The pulsating stream fluid has an increased cleansing effect. The pulsating fluid output is accomplished by the liquid flow itself acting on flow members within the nozzle chamber, and does not require a separate activating system.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. An oral care appliance for cleaning interproximal areas of teeth, comprising:
    a fluid jet appliance for producing a fluid jet flow;
    a nozzle assembly for the fluid jet appliance for directing the fluid jet flow to an exit opening from the nozzle assembly; and
    a liquid flow interrupter assembly including a hydrofoil vane within the nozzle assembly, the hydrofoil vane supported by springs which extend from opposing sides of the hydrofoil vane to opposing channels within the nozzle assembly, and the liquid flow interrupter assembly is supported by the springs within the nozzle assembly, wherein the liquid flow interrupter assembly is deflected from an original position by the fluid jet flow through a nozzle of the nozzle assembly to interrupt the fluid jet flow momentarily and then return to said original position as the fluid jet flow decreases, introducing a cyclical perturbation in the fluid jet flow, producing a series of fluid pulses from the exit opening.

2. The appliance of claim 1, wherein the hydrofoil vane is so configured and supported by the springs such that the hydrofoil vane moves in a direction of the fluid jet flow from the original position and then back in an opposing direction as the fluid jet flow decreases and is then interrupted.

3. The appliance of claim 1, wherein the hydrofoil vane is so configured and supported by said springs such that the hydrofoil vane moves back and forth within the nozzle assembly along a common axis of the springs, approximately 90° to a direction of the fluid jet flow past the hydrofoil vane as the fluid jet flow changes.

4. The appliance of claim 3, wherein the hydrofoil vane is configured and supported by said springs such that the hydrofoil vane oscillates rotationally about the springs or about an axis that is 90° to the common axis of the springs.

5. An oral care appliance for cleaning interproximal areas of teeth, comprising:
    a fluid jet appliance for producing a fluid jet flow;
    a nozzle assembly for the fluid jet appliance for directing the fluid jet flow to an exit opening from the nozzle assembly; and
    a liquid flow interrupter assembly including a bladder assembly, comprising inlet and outlet portions and successive stretchable portions and alternating stiff rings arranged between the inlet and outlet portions, wherein liquid flow at the inlet portion produces a circular zone of the fluid jet flow in successive stretchable portions of the bladder assembly, wherein as the liquid flow enters the bladder assembly a pressure in a first stretchable portion of the successive stretchable portion of the bladder assembly increases, resulting in an outward movement of the first stretchable portion of the bladder assembly, as the liquid flow continues to a second stretchable portion, the pressure in the first stretchable portion decreases, resulting in a pulsating liquid output at the outlet portion the liquid flow interrupter assembly supported by a support member within the nozzle assembly, wherein the interrupter assembly is deflected from an original position by the fluid jet flow through a nozzle of the nozzle assembly to interrupt the fluid jet flow momentarily and then return to said original position as the fluid jet flow decreases, introducing a cyclical perturbation in the fluid jet flow, producing a series of fluid pulses from the exit opening.

* * * * *